United States Patent [19]

Bell et al.

[11] 4,435,554

[45] Mar. 6, 1984

[54] EMULSION POLYMERIZATION PROCESS USING MONOBASIC ALKALI PHOSPHATE

[75] Inventors: Anthony J. Bell, Stow; Leland E. Beyersdorff, North Canton, both of Ohio

[73] Assignee: The Goodyear Tire & Rubber Company, Akron, Ohio

[21] Appl. No.: 412,697

[22] Filed: Aug. 30, 1982

[51] Int. Cl.$^3$ .................... C08F 236/12; C08F 4/08
[52] U.S. Cl. .................... 526/229; 526/233; 526/337
[58] Field of Search ................ 526/229, 233

[56] References Cited

U.S. PATENT DOCUMENTS

| | | | |
|---|---|---|---|
| 2,684,357 | 7/1954 | Troyan | 526/233 |
| 3,165,500 | 1/1965 | Fogemann et al. | 526/233 |
| 3,487,057 | 12/1969 | Frazer | 526/323.2 |
| 3,732,184 | 5/1973 | Findermonn et al. | 526/86 |
| 4,060,680 | 11/1977 | Herdy | 526/233 |

*Primary Examiner*—Joseph L. Schofer
*Assistant Examiner*—Peter F. Kulkosky
*Attorney, Agent, or Firm*—Bruce J. Hendricks; Alvin T. Rockhill

[57] ABSTRACT

This invention relates to an improved emulsion polymerization process. Specifically, this invention relates to an improved method for producing acrylonitrile-butadiene polymers. The improvement is characterized in that a reaction mixture contains a mono-basic alkali phosphate buffer which results in polymers that are resistant to subsequent Mooney rise.

8 Claims, No Drawings

EMULSION POLYMERIZATION PROCESS USING MONOBASIC ALKALI PHOSPHATE

TECHNICAL FIELD

The present invention pertains to an improved emulsion polymerization process. More specifically, it pertains to the preparation of latices with a mono-basic alkali phosphate buffer. The invention is based on the use of a monobasic alkali phosphate in the emulsion polymerization formulas, which results in the formulation of NBR rubber that is resistant to subsequent Mooney rise.

The rise in Mooney of hot NBR during lengthy storage periods has been a persistent problem that has plagued NBR producers for many years. A number of mechanisms has been proposed for this phenomenon, and numerous antioxidants assessed for its prevention. Although some antioxidant combinations have alleviated the problem somewhat, none have been completely or consistently effective.

SUMMARY OF THE INVENTION

This invention relates to a process for preparing hot polymerized acrylonitrile-butadiene polymers (NBR) with Mooney values that are essentially stable to change during subsequent storage. More specifically, this invention is directed to the preparation of thermally initiated emulsion polymerized NBR utilizing a monobasic alkali phosphate buffer in conjunction with the commonly employed potassium persulfate initiator.

DETAILED DESCRIPTION OF THE INVENTION

There is disclosed a process for the preparation of acrylonitrile-butadiene polymers wherein an anionic surfactant and potassium persulfate are used, the improvement which comprises the addition of a monobasic alkali phosphates to the emulsion polymerization formulation said monobasic alkali phosphate being of the general structural formula $MH_2PO_4$ 

wherein M is selected from the group consisting of sodium, potassium or lithium, said monobasic alkali phosphate being present in amounts from 0.4 to 1 part per hundred parts of total monomers present in the emulsion polymerization formulation.

The present invention consists of a process in which the emulsion polymerization is carried out in the presence of a monobasic alkali phosphate buffer represented by the formula $MH_2PO_4$ 

in which M represents sodium, potassium or lithium; and utilizing potassium persulfate as initiator. The emulsifying agent, or surfactant employed, may be any of the commonly used long hydrocarbon chain sulfonates or amidosulfosuccinates.

The critical role played by the mono-alkali phosphate in this process is underscored by a comparison of the Mooney stabilities of NBR produced in its presence with those obtained in its absence in otherwise identical polymerization formulations. Nevertheless, it should be noted that the Mooney stabilizing effect on NBR products afforded by the mono-alkali phosphate, is not realized unless used in conjunction with a persulfate initiator and an anionic-type surfactant.

A further limitation of this invention is that no additive can be used in the polymerization step recipe which will raise the pH of the system above 5.8 (which is the upper limit of the range normally effected by the $MH_2PO_4$-type buffer). Moreover, no other buffer can be present with the mono-alkali phosphate, even one which affords the same pH range (see Table IV, No. IX).

Although the pH range of the polymerization is a limitation, it is not primarily the pH factor that is responsible for the Mooney stabilizing effect that the monobasic phosphate exerts on the rubber products. A comparison of such effect with other buffers affording the same pH range (see Table IV) clearly demonstrates the ineffectiveness of the latter toward this end. Even the use of the closely structurally related sodium pyrophosphate does not result in a similarly Mooney stable product (Table IV, No. II). The feature common to all of the effective buffers is the presence of the $[H_2PO_4]$ moiety.

It is well known to those skilled in the art that the initial Mooney values for the rubber products obtained are largely determined by the level of chain transfer agents (such as dodecylmercaptan), employed in the polymerization step. In the process of this invention, a further favorable feature lies in the fact that the Mooney stability phenomenon is observed for NBR products possessing a wide range of initial Mooney values.

With respect to amounts, good results have been obtained when 0.4 to 1.0 part per hundred parts of total monomers (phm) of the mono-alkali phosphate has been used with 0.05 to 0.4 phm of the persulfate initiator in the temperature range of about 35° to about 55° C. Good results are not necessarily limited to these ranges.

The emulsifying agent or surfactant employed may be any of the commonly used long hydrocarbon-chain sulfonates or amidosulfosuccinates. The optimum level of surfactant employed in the process may vary according to the selection and generally falls in the 0.5 to 5.0 phm range. Examples of surfactant types are alkylaryl sulfonates, naphthenic sulfonates, sulfonated alpha olefins, and amidosulfosuccinates. The effect of the particular choice of surfactant within this group on Mooney stability of the NBR product can be seen in Table III. The choice of surfactant within the defined groups is not critical with respect to obtaining products possessing good resistance to subsequent Mooney rise.

Modifiers or chain transfer agents used in the process of the invention are long-chain alkyl mercaptans and are used to control the molecular weight of the polymers. Representative of the mercaptans that can be used in the process of the present invention are lauryl, t-dodecyl and t-hexadecyl mercaptans. It is possible to employ any such modifiers in variable amounts, depending upon the desired molecular weight range of the polymer. Tertiary dodecyl mercaptan is a preferred chain transfer agent used at a level of 0.2 to 0.8 phm (parts per one hundred parts of monomers). It may either be premixed with the primary monomers or charged separately.

As one skilled in the art is aware, the amount of water that need be present in an emulsion polymerization formulation need only be that amount sufficient to form the emulsion. Preferably the amount of water is approximately 200 parts per 100 parts of total monomers present. However as one realizes the amount of water should not be deemed a limitation to the present invention.

Various known antioxidants are preferably added to the polymer produced in accordance within the scope of the present invention.

The preparation of a polymer latex employs many different nonpolymerizable components whose function to a great deal is interdependent. It is conceivable that the aqueous phase in the reaction mixture may include certain electrolytes, such as potassium or sodium halides.

The polymerization described has been carried out using a batch process. However, it is conceivable that it may be applied in a continuous process.

The Mooney stabilities of the various rubber products were evaluated using an accelerated aging technique by which the samples were placed in a hot air oven at 70° C.

The standard formulation used in the polymerization step for both the process described in this invention and in the prior art controls is given in a general way in Table I.

TABLE I

STANDARD REACTANTS AND LEVELS USED IN POLYMERIZATION

| Reactants | Amounts (Parts by Weight) |
|---|---|
| Water | 200.00 |
| Surfactant | 2.50 |
| Buffer | 0.60 |
| Potassium persulfate | 0.50 |
| Dodecylmercaptan | 0.5–1.0 |
| Divinylbenzene (55% solution) | 0.50 |
| Acrylonitrile | 33.00 |
| Butadiene | 67.00 |

The level of dodecylmercaptan, which affects the molecular weights of the copolymer products, were varied within the above range in order to obtain NBR rubber samples of various Mooney values.

The emulsion polymerizations were carried out at 40° C. until 32–33% solids were attained, and terminated with a sodium dimethyldithiocarbamate/diethyl hydroxylamine mixture. In order to protect the rubber, 2.9 parts of an antioxidant mixture were added to the latex just prior to the coagulation step.

Table II summarizes the results obtained when the normally used (prior art) buffers, $K_2CO_3$ and $Na_3PO_4$, are replaced with the $MH_2PO_4$ component of the present invention.

That the governing factor involved in the Mooney stabilization effect by the $MH_2PO_4$ component is not a matter of pH alone can be deduced from Table IV where results obtained using other acid-side buffers are shown. As can be seen, for example, the structurally related pyrophosphate (II) and monosodium citrate (III), both of which afford similar pH ranges to that of the $NaH_2PO_4$, fail to produce Mooney stable rubber, whereas the other monoalkali phosphates (IV and V), do indeed give results similar to the $NaH_2PO_4$ even though the pH range during polymerization is somewhat broad. Mixtures of the $MH_2PO_4$ component with another type of buffer, even with one affording the same pH range, render the system ineffective with respect to giving Mooney stable products. (Table IV, No. IX)

The effect of the surfactant employed in the $MH_2PO_4$ buffered polymerization, on the Mooney stability of the NBR product, is shown in Table III, where it can be seen to be minor.

The following examples are given to illustrate, but not necessarily to limit the scope of the present invention. All parts are given as parts by weight unless specifically stated otherwise.

TABLE II

ACCELERATED AGING RESULTS FOR NBR PREPARED WITH STANDARD BUFFERS VS. $MH_2PO_4$ BUFFERS

| No. | Buffer[a] | Original Mooney | Mooney after 7 days/ 70° C. | Mooney after 28 days/ 70° C. | % Change |
|---|---|---|---|---|---|
| | | Sulframin 1260 Surfactant System | | | |
| | | Control | | | |
| I | $K_2CO_3$ | 52 | 79.5 | — | +53 |
| II | $K_2CO_3$ | 66.5 | 88.5 | — | +33 |
| III | $K_2CO_3$ | 75.5 | 100.0 | — | +32 |
| | | $MH_2PO_4$ | | | |
| IV | $NaH_2PO_4$ | 66 | 67.5 | — | +2 |
| V | $NaH_2PO_4$ | 85.5 | 90 | — | +4 |
| VI | $KH_2PO_4$ | 92 | 94 | — | +2.2 |
| VII | $LiH_2PO_4$ | 86 | 88 | — | +2.3 |
| | | Las/Tamol N Surfactant System | | | |
| | | Control | | | |
| VIII | $Na_3PO_4$ | 60 | — | 88.5 | +48 |
| IX | $Na_3PO_4$ | 66 | — | 109 | +65 |
| X | $Na_3PO_4$ | 74 | — | 118 | +59 |
| XI | $Na_3PO_4$ | 92 | — | 140 | +52 |
| | | $MH_2PO_4$ | | | |
| XII | $NaH_2PO_4$ | 72 | — | 78.5 | +9 |
| XIII | $NaH_2PO_4$ | 98 | — | 110 | +12 |

[a]Used in formulation shown in Table I with varying levels of t-dodecylmercaptan

TABLE III

ACCELERATED AGING RESULTS FOR NBR PREPARED WITH VARIOUS SURFACTANTS AND $NaH_2PO_4$ BUFFER

| Surfactant[a] | Original Mooney | 7 days at 70° C. | % Change | Mooney After 28 days at 70° C. | % Change |
|---|---|---|---|---|---|
| Sulframin 1260[1] | 85.5 | 90 | +5.0 | 91 | +6 |
| LAS'/TAMOL N[2] | 98 | 112 | +14 | 110 | +12 |
| Sulframin AOS[3] | 112 | 117 | +4.5 | 116 | +4 |
| Aerosol 413[4] | 107.5 | 118 | +10 | 124 | +15 |

[1]Alkylaryl sulfonate-type surfactant
[2]Naphthenic sulfonate-type surfactant
[3]Sulfonated alpha-olefin-type surfactant (commercially produced by Witco Chemical Corp.)
[4]Amidosulfosuccinate-type surfactant
[a]Used in formulation shown in Table I.

TABLE IV

ACCELERATED AGING RESULTS FOR NBR PREPARED WITH VARIOUS BUFFERS AND SULFRAMIN 1260

| NO. | Buffer[a] | Original[b] pH | Final pH | Original Mooney | Mooney After 7 days/70° C. | % Change | Mooney After 28 Days/70° C. | % Change |
|---|---|---|---|---|---|---|---|---|
| I | $NaH_2PO_4$ | 5.0 | 5.8 | 85.5 | 90 | +5.3 | 91 | +6.4 |
| II | $Na_4P_2O_7$ | 4.7 | 5.5 | 55 | 83 | +51 | 93 | +69 |
| III | Monosodium citrate | 5.2 | 5.3 | 48 | 68 | +42 | 97 | +102 |
| IV | $KH_2PO_4$ | 4.8 | 3.7 | 92 | 94 | +2.2 | 96 | +4.3 |
| V | $LiH_2PO_4$ | 5.3 | 3.0 | 86 | 88 | +2.3 | — | — |
| VI | $NH_4.H_2PO_4$ | 4.8 | 3.5 | 70 | 79 | +13 | — | — |
| VII | $Na.H_2PO_4$ $Na_2.HPO_4$ | 6.5 | 6.5 | 63 | 93 | +48 | 106 | +68 |
| VIII | $NH_4.H_2PO_4$ $(NH_4)_2HPO_4$ | 6.6 | 6.4 | 93 | 138 | +91 | — | — |
| IX | $NaH_2PO_4$ Monosodium Citrate | 5.4 | 5.7 | 4.3 | 64 | +49 | — | — |

[a]Used in formulation shown in Table I, with S-1260 employed as surfactant.
[b]pH of medium prior to monomer addition.

EXAMPLE 1 (Control)

To an 8 oz. bottle were charged 100 parts of water 0.3 parts of $K_2CO_3$ (buffer), 1.25 parts of Sulframin 1260 (surfactant, Witco Chemical Corp.), 0.15 parts of potassium persulfate initiator, 0.45 parts of dodecylmercaptan (chain transfer agent), 0.25 parts of a 55% solution of divinylbenzene, 16.5 parts of acrylonitrile and 33.5 parts of butadiene. The capped bottle was placed in a 40° C. polymerization bath, and tumbled for 20 hours. The polymerization was then terminated with 0.4 parts of a 40% aqueous solution of sodium dimethyldithiocarbamate. About 0.5 to 1 part of an antioxidant was added to the latex with stirring and the rubber isolated by coagulation in a 1.5% aqueous solution of magnesium sulfate.

After drying in an oven at 65° C. for 3 hours, the sample was submitted for testing. An initial Mooney value of 66.5 was obtained. After 7 days accelerated aging at 70° C., the Mooney had risen to a value of 88.5 (i.e., at 33% increase).

EXAMPLE 2

To an 8 oz. bottle was charged the same formulation as in Example 1, except that the $K_2CO_3$ buffer was replaced with an equal amount of monosodium phosphate ($NaH_2PO_4$). After 20 hours in a 40° C. polymerization bath the polymerization was terminated and the latex worked-up as in Example 1. The rubber product obtained was found to have an initial Mooney value of 66; and after 7 days accelerated aging, a Mooney value of 67.5 (+2%).

EXAMPLE 3

To an 8 oz. bottle was charged the same formulation as in Example 1, except that 0.3 parts of monopotassium phosphate ($KH_2PO_4$) was employed as the buffer. After 20 hours in a 40° C. polymerization bath, the polymerization was terminated, and the latex worked-up as in Example 1. An initial Mooney value of 92 was obtained for the rubber, which rose to 94 (+2.2) after 28 days accelerated aging.

EXAMPLE 4 (Control)

To an 8 oz. bottle were charged 100 parts of water, 0.25 parts of trisodium phosphate ($Na_3PO_4$), 0.1 part LAS (commercially produced by Pilot Chemical Co.), 1.25 parts of TAMOL N (commerically produced by Rohm and Haas Company), 0.1 part of potassium persulfate, 0.5 parts of dodecylmercaptan, 0.25 parts of a 55% solution of divinylbenzene, 16.5 parts of acrylonitrile and 33.5 parts of butadiene.

The capped bottle was placed in a 40° C. polymerization bath and tumbled for 18 hours. The polymerization was terminated and worked-up as described in Example 1. An initial Mooney value of 74 was obtained for the product which rose to 118 (+59%) after 28 days accelerated aging.

EXAMPLE 5

To an 8 oz. bottle was charged the same formulation as in Example 4, except that the trisodium phosphate ($Na_3PO_4$) buffer was replaced with an equal amount of monosodium phosphate ($NaH_2PO_4$). After 18 hours in a 40° C. bath the polymerization was terminated, and the latex worked-up as in Example 1. An initial Mooney value of 72 was obtained for the rubber product, which rose to 79 (+9%) after 28 days accelerated aging.

EXAMPLE 6 (Control)

To an 8 oz. bottle were charged the same formulation as in Example 1, except that the Sulframin 1260 surfactant was replaced with a sulfosuccinate-type surfactant, Aerosol 413 (commercially produced by American Cynamid Co.). After 21 hours in a 40° C. polymerization bath, the polymerization was terminated and worked-up as in Example 1. The rubber obtained, gave an initial Mooney of 102, which after 28 days accelerated aging, rose to 162 (+59%).

EXAMPLE 7

To an 8 oz. bottle was charged the same formulation as in Example 6, except that the $K_2CO_3$ buffer was replaced with monosodium phosphate ($NaH_2PO_4$). After 21 hours in a 40° C. polymerization bath, the polymerization was terminated, and the latex worked-up as in Example 1. The rubber product obtained, showed an initial Mooney value of 107, which rose to 124 (+15%) after 28 days accelerated aging.

We claim:
1. A process for the preparation of acrylonitrile-butadiene rubber wherein an anionic surfactant and potassium persulfate is used, the improvement which comprises the addition of a monobasic alkali phosphate to an emulsion polymerization formulation said monobasic alkali phosphate being of the general structural formula $MH_2PO_4$ wherein M is selected from the group consisting of sodium, potassium or lithium;
said monobasic alkali phosphate being present in amounts from 0.4 to 1 part per hundred parts of total monomers present in the emulsion polymerization formulation.

2. A process for the preparation of acrylonitrile-butadiene polymers which are resistant to subsequent Mooney rise comprising the addition of a monobasic alkali phosphate to an emulsion polymerization formulation,
said monobasic alkali phosphate being of the general structural formula $MH_2PO_4$ wherein M is selected from the group consisting of sodium, potassium or lithium;
said monobasic alkali phosphate being present in amounts from 0.4 to 1 part;
said emulsion polymerization formulation comprising sufficient parts of H₂O to form an emulsion
from 0.5 to 5.0 parts of an anionic surfactant wherein said surfactant is selected from the group consisting of alkylaryl sulfonates, naphthenic sulfonates, sulfonated alfa-olefins, amidosulfosuccinates or mixtures thereof,
from 0.05 to 0.4 parts of potassium persulfate,
from 0.5 to 0.95 parts of dodecylmercaptan,
from 85 to 65 parts of butadiene, and
from 15 to 35 parts of acrylonitrile.

3. A process of claim 2 wherein said emulsion polymerization formulation is present 0.1 to 0.7 parts of divinylbenzene (in a 55% solution of ethylbenzene).

4. A process of claim 2 wherein the pH of the emulsion polymerization formulation after addition of the monobasic alkali phosphate is maintained below 5.8.

5. A process of claim 2 wherein the monobasic alkali phosphate is mono-sodium phosphate.

6. A process of claim 2 wherein said monobasic alkali phosphate is mono-potassium phosphate.

7. A process of claim 2 wherein the monobasic alkali phosphate is present in amounts from 0.5 to 0.6 parts.

8. A process for the preparation of acrylonitrile-butadiene polymers which are resistant to subsequent Mooney rise comprising the addition of a monobasic alkali phosphate to an emulsion polymerization formulation.
said monobasic alkali phosphate being of the general structural formula $MH_2PO_4$ wherein M is selected from the group consisting of sodium, potassium or lithium;
said monobasic alkali phosphate being present in amounts from 0.5 to 0.6 parts;
said emulsion polymerization formulation comprising 200 parts of H₂O,
from 2.0 to 3.0 parts of Sulframin 1260,
from 0.2 to 0.3 parts of potassium persulfate,
from 0.75 to 0.9 parts of tertiary-dodecyl mercaptan,
from 0.5 to 0.6 parts of a 55% solution of divinylbenzene,
67 parts of butadiene,
33 parts of acrylonitrile.

* * * * *